United States Patent
Noguchi et al.

(10) Patent No.: US 9,873,787 B2
(45) Date of Patent: Jan. 23, 2018

(54) COPOLYMER FOR IMPROVING METHACRYLIC RESIN HEAT RESISTANCE

(71) Applicant: DENKA COMPANY LIMITED, Tokyo (JP)

(72) Inventors: Tetsuo Noguchi, Tokyo (JP); Takeshi Ohtsuka, Tokyo (JP); Masanori Matsumoto, Tokyo (JP); Yuichi Shindo, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/216,265

(22) Filed: Jul. 21, 2016

(65) Prior Publication Data
US 2016/0326360 A1 Nov. 10, 2016

Related U.S. Application Data

(62) Division of application No. 14/417,721, filed as application No. PCT/JP2013/070484 on Jul. 29, 2013, now abandoned.

(30) Foreign Application Priority Data

Jul. 30, 2012 (JP) .................. 2012-168675

(51) Int. Cl.
| | | |
|---|---|---|
| *C08L 35/02* | (2006.01) | |
| *C08J 5/18* | (2006.01) | |
| *C08F 212/08* | (2006.01) | |
| *C08F 220/10* | (2006.01) | |
| *C08F 222/02* | (2006.01) | |
| *C09J 133/06* | (2006.01) | |
| *C08F 24/00* | (2006.01) | |
| *C08L 33/08* | (2006.01) | |
| *C08L 33/12* | (2006.01) | |
| *G02B 1/04* | (2006.01) | |
| *C08L 25/14* | (2006.01) | |

(52) U.S. Cl.
CPC ............. *C08L 35/02* (2013.01); *C08F 24/00* (2013.01); *C08F 212/08* (2013.01); *C08F 220/10* (2013.01); *C08F 222/02* (2013.01); *C08J 5/18* (2013.01); *C08L 33/08* (2013.01); *C08L 33/12* (2013.01); *C09J 133/06* (2013.01); *G02B 1/04* (2013.01); *C08J 2333/00* (2013.01); *C08J 2333/12* (2013.01); *C08J 2335/02* (2013.01); *C08J 2433/12* (2013.01); *C08J 2435/02* (2013.01); *C08L 25/14* (2013.01)

(58) Field of Classification Search
CPC ... C08L 35/02; C08L 33/08; C08L 33/12; C08J 5/18; C08F 212/08; C08F 220/10; C08F 24/00; C09J 133/06; G02B 1/04
USPC ........................................... 526/319
See application file for complete search history.

(56) References Cited

U.S. PATENT DOCUMENTS

| | | | | |
|---|---|---|---|---|
| 3,725,360 A | * | 4/1973 | Adams | .............. C08F 222/08 526/146 |
| 4,387,191 A | * | 6/1983 | Dufour | .............. C08K 5/521 524/145 |
| 8,399,567 B2 | * | 3/2013 | Chun | .............. B29C 47/0021 525/216 |
| 9,365,713 B2 | * | 6/2016 | Noguchi | .............. C08L 25/12 |
| 2011/0269910 A1 | * | 11/2011 | Chun | .............. B29C 47/0021 525/205 |

FOREIGN PATENT DOCUMENTS

| | | | |
|---|---|---|---|
| CN | 102272640 A | | 12/2011 |
| JP | 60137915 A | * | 7/1985 |
| JP | 601379155 A | * | 7/1985 |

OTHER PUBLICATIONS

Chinese Office Action dated Jul. 5, 2016, issued by the Chinese Patent Office in corresponding application CN 201380040699.8.
International Search Report dated Oct. 29, 2013, issued to the corresponding International Application No. PCT/JP2013/070484.

* cited by examiner

*Primary Examiner* — Michael M Bernshteyn
(74) *Attorney, Agent, or Firm* — Stein IP, LLC

(57) ABSTRACT

A copolymer for improving heat resistance of a methacrylic resin which can achieve preservation of excellent transparency of the methacrylic resin and improvement in heat resistance, and can provide a molded product having excellent appearance, by adding the copolymer to the methacrylic resin, is provided. According to the present invention, a copolymer for improving heat resistance of a methacrylic resin, including: 45 to 85 mass % of an aromatic vinyl monomer unit; 5 to 45 mass % of a (meth)acrylic acid ester monomer unit; and 10 to 20 mass % of an unsaturated dicarboxylic acid anhydride monomer unit; wherein the copolymer has a total light transmittance of 88% or more, the total light transmittance being measured in accordance with ASTM D1003 for a sample with 2 mm-thickness, is provided.

11 Claims, No Drawings

COPOLYMER FOR IMPROVING METHACRYLIC RESIN HEAT RESISTANCE

CROSS-REFERENCE TO RELATED APPLICATIONS

This application is a divisional of U.S. application Ser. No. 14/417,721, filed Jan. 27, 2015, which is a national stage of International Application No. PCT/JP2013/070484, filed Jul. 29, 2013, which claims the benefit of priority to Japanese Application No. 2012-168675, filed Jul. 30, 2012, in the Japanese Patent Office. All disclosures of the documents named above are incorporated herein by reference.

BACKGROUND OF THE INVENTION

1. Field of the Invention

The present invention relates to a copolymer for improving heat resistance of a methacrylic resin, a resin composition of the copolymer for improving heat resistance of the methacrylic resin and a methacrylic resin, and a molded body made from the resin composition.

2. Description of the Related Art

Transparent resin is used for various purposes including parts of consumer electronics, a food container, and general goods. Recently, from the viewpoint of light weight, productivity, and cost, transparent resin has been used frequently as a retardation film, a polarizing film protecting film, an antireflection film, a diffusion board, and a light guide plate; which are used in thin liquid crystal display for substituting cathode-ray tube TV monitors or optical parts of electroluminescence elements.

For optical application, methacrylic resin has been widely used. Here, methacrylic resin is superior in optical characteristics such as transparency and the like, however, it is inferior in heat resistance and the like, and thus the application of methacrylic resin was limited.

As the resin having improved heat resistance, a copolymer resin obtained by copolymerizing methyl methacrylate, maleic anhydride, and styrene has been known (for example, Patent Literature 1).

In addition, a copolymer resin obtained by a copolymerizing aromatic vinyl monomer, meth(acrylic) acid ester monomer, and at least one of unsaturated dicarboxylic acid imide derivative and unsaturated dicarboxylic acid anhydride monomer (for example, Patent Literature 2).

CITATION LIST

Patent Literature

[Patent Literature 1] JP S57-153008A
[Patent Literature 2] WO 2009/031544

SUMMARY OF THE INVENTION

Technical Problem

The resin disclosed in Patent Literature 1 is superior in heat resistance compared with the methacrylic resin. However, the resin of Patent Literature 1 is inferior in heat stability, and thus tends to suffer so-called molding defects such as silver streak, gas burning, coloring, and air voids during molding. Therefore, the application of the resin was limited.

The resin disclosed in Patent Literature 2 is superior in heat resistance, however, it is inferior in moldability. Therefore, molding defects such as flow marks and coloring tend to occur, resulting in limited application.

The present invention has been made by taking the afore-mentioned circumstances into consideration. The present invention provides a copolymer for improving heat resistance of a methacrylic resin which can achieve preservation of excellent transparency of the methacrylic resin, improvement in heat resistance, and a molded product having excellent appearance, by adding a specified amount of the copolymer to the methacrylic resin.

Solution to Problem

The present invention is summarized as follows.
(1) A copolymer for improving heat resistance of a methacrylic resin, comprising:
  45 to 85 mass % of an aromatic vinyl monomer unit;
  5 to 45 mass % of a (meth)acrylic acid ester monomer unit; and
  10 to 20 mass % of an unsaturated dicarboxylic acid anhydride monomer unit; wherein the copolymer has a total light transmittance of 88% or more, the total light transmittance being measured in accordance with ASTM D1003 for a sample with 2 mm-thickness.
(2) The copolymer of (1), comprising:
  50 to 80 mass % of the aromatic vinyl monomer unit;
  8 to 38 mass % of the (meth)acrylic acid ester monomer unit; and
  12 to 18 mass % of the unsaturated dicarboxylic acid anhydride monomer unit.
(3) The copolymer of (1) or (2), wherein the weight average molecular weight (Mw) of the copolymer is $10 \times 10^4$ to $20 \times 10^4$.
(4) A resin composition, comprising:
  5 to 50 mass % of the copolymer of any one of (1) to (3); and
  50 to 95 mass % of a methacrylic resin.
(5) The resin composition of (4), wherein the methacrylic resin comprises:
  70 to 100 mass % of a meth(acrylic) acid ester monomer unit; and
  0 to 30 mass % of an aromatic vinyl monomer unit.
(6) A molded body comprising a resin composition of (4) or (5).
(7) The molded body of (6), being an optical part.
(8) The molded body of (7), being an optical film.
(9) The molded body of (8), being a polarizing film protecting film, a retardation film, or an antireflection film.

Advantageous Effects of Invention

According to the present invention, a copolymer for improving heat resistance of a methacrylic resin which can achieve preservation of excellent transparency of the methacrylic resin and improvement in heat resistance, and can provide a molded product having excellent appearance, by adding the copolymer to the methacrylic resin, can be provided.

DESCRIPTION OF THE EMBODIMENTS

Explanation of Terms

In the present specification, the description "A to B" means A or more and B or less.

Hereinafter, embodiments of the present invention will be described in detail.

As the aromatic vinyl monomer unit, units derived from various styrene-based monomers such as styrene, o-methyl styrene, m-methyl styrene, p-methyl styrene, 2,4-dimethyl styrene, ethyl styrene, p-tert-butyl styrene, α-methyl styrene, and α-methyl-p-methyl styrene can be mentioned. Among these, styrene unit is preferable. The aromatic vinyl monomer unit can comprise one type of these units or can comprise two or more types of these units.

As the (meth)acrylic acid ester monomer unit, units derived from various methacrylic acid ester monomers such as methyl methacrylate, ethyl methacrylate, n-butyl methacrylate, 2-ethylhexyl methacrylate, dicyclopentanyl methacrylate, and isobornyl methacrylate; and various acrylic acid ester monomers such as methyl acrylate, ethyl acrylate, n-butyl acrylate, 2-methylhexyl acrylate, 2-ethylhexyl acrylate, and decyl acrylate can be mentioned. Among these, methyl methacrylate unit is preferable. The (meth)acrylic acid ester monomer unit can comprise one type of these units or can comprise two or more types of these units.

As the unsaturated dicarboxylic acid anhydride monomer unit, units derived from various acid anhydride monomers such as maleic anhydride, itaconic anhydride, citraconic anhydride, and aconitic anhydride can be mentioned. Among these, maleic anhydride unit is preferable. The unsaturated dicarboxylic acid anhydride monomer unit can comprise one type of these units or can comprise two or more types of these units.

The constitutional units of the copolymer according to the present invention is 45 to 85 mass % of the aromatic vinyl monomer unit, 5 to 45 mass % of the (meth)acrylic acid ester monomer unit, and 10 to 20 mass % of the unsaturated dicarboxylic acid anhydride monomer unit. Preferably, the constitutional units of the copolymer is 50 to 80 mass % of the aromatic vinyl monomer unit, 8 to 38 mass % of the (meth)acrylic acid ester monomer unit, and 12 to 18 mass % of the unsaturated dicarboxylic acid anhydride monomer unit.

Preferable content of the aromatic vinyl monomer unit is 85 mass % or less, since the effect of providing heat resistance to the methacrylic resin can be improved; and 80 mass % or less, since the effect of providing heat resistance can be further improved. Preferable content of the meth(acrylic) acid ester monomer unit is 45 mass % or less, since the heat stability can be improved and a molded product having a superior appearance can be obtained by molding the resin composition prepared by formulating the meth(acrylic) acid ester monomer unit in the methacrylic resin; and 38 mass % or less, since the heat stability can be further improved and a molded product having a further superior appearance can be obtained by molding the resin composition prepared by formulating the meth(acrylic) acid ester monomer unit in the methacrylic resin. Preferable content of the unsaturated dicarboxylic acid anhydride monomer unit is 20 mass % or less, since the compatibility with the methacrylic resin can be improved and a resin composition having a superior transparency and improved heat resistance can be prepared by formulating the unsaturated dicarboxylic acid anhydride monomer unit in the methacrylic resin; and 18 mass % or less, since the compatibility with the methacrylic resin can be further improved and a resin composition having a further superior transparency and improved heat resistance can be prepared by formulating the unsaturated dicarboxylic acid anhydride monomer unit in the methacrylic resin. On the other hand, preferable content of the aromatic vinyl monomer unit is 45 mass % or more, since the heat stability can be improved and a molded product having a superior appearance can be obtained by molding the resin composition prepared by formulating the aromatic vinyl monomer unit in the methacrylic resin; and 50 mass % or more, since the heat stability can be further improved and a molded product having a further superior appearance can be obtained by molding the resin composition prepared by formulating the aromatic vinyl monomer unit in the methacrylic resin. Preferable content of the meth(acrylic) acid ester monomer unit is 5 mass % or more, since the compatibility with the methacrylic resin can be improved and a resin composition having a superior transparency and improved heat resistance can be prepared by formulating the meth(acrylic) acid ester monomer unit in the methacrylic resin; and 8 mass % or more, since the compatibility with the methacrylic resin can be further improved and a resin composition having a further superior transparency and improved heat resistance can be prepared by formulating the meth(acrylic) acid ester monomer unit in the methacrylic resin. In addition, preferable content of the unsaturated dicarboxylic acid anhydride monomer unit is 10 mass % or more, since the compatibility with the methacrylic resin can be improved, a resin composition having a superior transparency can be prepared by formulating the unsaturated dicarboxylic acid anhydride monomer unit in the methacrylic resin, and the effect of providing heat resistance to the methacrylic resin can be improved; and 12 mass % or more, since the compatibility with the methacrylic resin can be further improved, a resin composition having a further superior transparency can be prepared by formulating the unsaturated dicarboxylic acid anhydride monomer unit in the methacrylic resin, and the effect of providing heat resistance to the methacrylic resin can be further improved.

The copolymer of the present invention can contain a copolymerizable vinyl monomer unit other than the aromatic vinyl monomer unit, the (meth)acrylic acid ester monomer unit, and the unsaturated dicarboxylic acid anhydride monomer unit, by an amount which does not have an adverse effect to the effect of the present invention. Here, the preferable amount is 5 mass % or less. As an example of the copolymerizable vinyl monomer unit, units derived from vinyl cyanide monomers such as acrylonitrile and methacrylonitrile; vinyl carboxylic acid monomers such as acrylic acid and methacrylic acid; N-alkyl maleimide monomers such as N-methyl maleimide, N-ethyl maleimide, N-butyl maleimide, and N-cyclohexyl maleimide; N-aryl maleimide monomers such as N-phenyl maleimide, N-methylphenyl maleimide, and N-chlorophenyl maleimide can be mentioned. The copolymerizable vinyl monomer unit can comprise two or more types of these units.

The copolymer of the present invention has a total light transmittance of 88% or more, the total light transmittance being measured in accordance with ASTM D1003 for a sample with 2 mm thickness. Preferably, the total light transmittance is 89% or more, and more preferably 90% or more. When the total light transmittance for the sample with 2 mm thickness is 88% or more, the transparency of the resin composition prepared by formulating the copolymer in the methacrylic resin becomes superior. Here, the total light transmittance is a measurement value obtained as follows. First, a mirror plate having a length of 90 mm, a width of 55 mm, and a thickness of 2 mm was prepared using an injection moulding machine (IS-50EPN, available from TOSHIBA MACHINE CO., LTD.), with the molding conditions of a cylinder temperature of 230° C. and a mold temperature of 40° C. Then, the mirror plate was subjected to the measurement in compliance with ASTM D1003, using a haze meter (NDH-1001DP, available from NIPPON DENSHOKU INDUSTRIES CO., LTD.).

The copolymer of the present invention preferably has a weight average molecular weight (Mw) of $10 \times 10^4$ to $20 \times 10^4$. More preferably, the weight average molecular weight (Mw) is $12 \times 10^4$ to $18 \times 10^4$. When the weight average molecular weight (Mw) is too large, there are cases where the moldability of the resin composition prepared by formulating the copolymer in the methacrylic resin and the appearance of the molded product becomes inferior. On the other hand, when the weight average molecular weight (Mw) becomes too small, there are cases where the moldability and the strength of the molded product become inferior. Here, the weight average molecular weight (Mw) is a value converted to a molecular weight of polystyrene measured by gel permeation chromatography (GPC). The value measured is obtained by the following measuring conditions.

Name of Instrument: SYSTEM-21 Shodex (available from Showa Denko K.K.)
Column: PL gel MIXED-B, 3 columns connected in series
Temperature: 40° C.
Detection: differential refractive index
Eluent: tetrahydrofuran
Concentration: 2 mass %
Callibration Curve: standard polystyrene (PS) (available from Polymer Laboratories Ltd) was used for preparation The manufacturing method of the copolymer of the present invention will be described.

There is no particular limitation regarding the polymerization method. Here, the copolymer can be manufactured by known methods such as solution polymerization, bulk polymerization, and the like; and the solution polymerization is preferable. The solvent used in the solution polymerization is preferably nonpolymerizable, since it hardly produces by-products, and the adverse effect is less. There is no particular limitation with respect to the type of the solvent. For example, ketones such as acetone, methyl ethyl ketone, methyl isobutyl ketone, and acetophenone; ethers such as tetrahydrofuran and 1,4-dioxane; aromatic hydrocarbons such as toluene, ethyl benzene, xylene, and chlorobenzene, can be mentioned. Here, from the viewpoint of the solubility of the monomers and the copolymer, and the ease to collect the solvent, methyl ethyl ketone and methyl isobutyl ketone are preferable. The addition amount of the solvent is preferably 10 to 100 parts by mass, more preferably 30 to 80 parts by mass, with respect to 100 parts by mass of the copolymer to be obtained. When the addition amount is 10 parts by mass or more, it is preferable in view of controlling the reaction speed and the viscosity of the polymer solution. When the addition amount is 100 parts by mass or less, it is preferable in view of obtaining the desired weight average molecular weight (Mw).

The polymerizing process can be any one of the batch type polymerization method, semi-batch type polymerization method, and continuous polymerization method. Here, the batch type polymerization method is preferable in view of obtaining the desired molecular weight range and transparency.

There is no particular limitation regarding the type of polymerization. Here, radical polymerization method is preferable in view of manufacturing by a simple process with high productivity. There is no particular limitation regarding the polymerization initiator. For example, known organic peroxides such as benzoyl peroxide, t-butyl peroxybenzoate, 1,1-bis(t-butyl peroxy)-2-methylcyclohexane, t-butyl peroxy isopropyl monocarbonate, t-butyl peroxy-2-ethylhexanoate, t-butyl peroxyacetate, dicumyl peroxide, and ethyl-3,3-di-(t-butyl peroxy) butylate; and known azo compounds such as azobisisobutyronitrile, azobiscyclohexanecarbonitrile, azobismethylpropionitrile, and azobismethylbutyronitrile; can be used. These polymerization initiators can be used by two or more types in combination. Among these, organic peroxides having the 10 hour half life temperature in the range of 70 to 110° C. is preferably used.

The copolymer of the present invention has a total light transmittance of 88% or more, the total light transmittance being measured in accordance with ASTM D1003 for a sample with 2 mm thickness. There is no particular limitation regarding the polymerization procedure so long as the copolymer satisfying the above condition is obtained. Here, in order to obtain a copolymer having a transparency with a total light transmittance of 88% or more, the polymerization need be carried out so that the composition distribution in the copolymer becomes small. Since the aromatic vinyl monomer and the unsaturated dicarboxylic acid anhydride monomer have high alternating copolymerization property, it is preferable to add the unsaturated dicarboxylic acid anhydride monomer separately so as to correspond with the polymerization speed of the aromatic vinyl monomer and the (meth)acrylic acid ester monomer. The polymerization speed can be controlled by adjusting polymerization temperature, polymerization period, and addition amount of the polymerization initiator. It is preferable to add the polymerization initiator separately, since the polymerization speed can be controlled easily.

In addition, in order to obtain a copolymer having a weight average molecular weight (Mw) in the preferable range of $10 \times 10^4$ to $20 \times 10^4$, addition amount of the solvent and the addition amount of the chain transfer agent shall be adjusted in addition to the adjustment of polymerization temperature, polymerization period, and the addition amount of the polymerization initiator. There is no particular limitation regarding the chain transfer agent. For example, known chain transfer agents such as n-dodecyl mercaptan, t-dodecyl mercaptan, and 2,4-diphenyl-4-methyl-1-pentene can be used.

After the completion of the polymerization, thermal stabilizers such as hindered phenol-based compounds, lactone-based compounds, phosphorus-based compounds, and sulfur-based compounds; light stabilizers such as hindered amine-based compounds and benzotriazole-based compounds; lubricants; plasticizers; colorants; anti-static agents; mineral oils; and the like can be added to the polymer solution as necessary. It is preferable that the addition amount of such additive is less than 0.2 parts by mass with respect to 100 parts by mass of the entire monomer unit. These additives can be used singly, or in a combination of two or more types.

There is no particular limitation regarding the method for collecting the copolymer of the present invention from the polymerization solution. Here, known devolatilization technique can be used. For example, a method in which the polymerization solution is continuously fed to a twin-screw devolatilizing extruder using a gear pump, followed by devolatilization treatment of the polymerization solvent, unreacted monomers, and the like, can be mentioned. Here, the devolatilization component including the polymerization solvent, unreacted monomers, and the like can be collected by condensation using a condenser and the like. Then, the condensed solution can be purified using a distilling column, and the polymerization solvent can be recycled.

The copolymer of the present invention thus obtained can be used as a heat resistance improving agent for the methacrylic resin. There is no particular limitation regarding the method for preparing a resin composition by kneading and mixing the copolymer of the present invention and the methacrylic resin. Here, known techniques for melt kneading can be used. As a preferably used melt kneading device, screw extruders such as a single screw extruder, a twin screw extruder having engaging flights and screws rotating in the same direction, a twin screw extruder having engaging flights and screws rotating in different directions, and a twin screw extruder having non-engaging or partially-engaging flights; a Banbury mixer; a ko-kneader; and a mixing mill can be mentioned.

The resin composition prepared by the copolymer of the present invention and the methacrylic resin is preferably formulated with 5 to 50 mass % of the copolymer and 50 to 95 mass % of the methacrylic resin. By such, excellent balance can be achieved in the transparency, color phase, heat resistance, impact resistance, and moldability. More preferably, the resin composition is formulated with 10 to 30 mass % of the copolymer and 70 to 90 mass % of the methacrylic resin.

The methacrylic resin is preferably formulated with 70 to 100 mass % of the meth(acrylic) acid ester monomer unit and 0 to 30 mass % of the aromatic vinyl monomer unit. By such, compatibility with the copolymer of the present invention can be improved, and the resin composition prepared would have excellent transparency, color phase, heat resistance, and moldability. More preferably, the methacrylic resin is formulated with 75 to 100 mass % of the meth (acrylic) acid ester monomer unit and 0 to 25 mass % of the aromatic vinyl monomer unit.

The resin composition can be formulated with stabilizers, plasticizers, lubricants, antioxidants, ultraviolet absorbers, light stabilizers, colorants, and the like, so long as it does not adversely affect the effect of the present invention.

The resin composition comprising the copolymer of the present invention and the methacrylic resin can achieve preservation of excellent transparency and improved heat resistance. Accordingly, the molded body made from the resin composition can be widely used also in the application where heat resistance is required. As an example of such application, car-mounted parts, parts of consumer electronics, and optical parts can be mentioned. Regarding the optical parts, the resin composition is particularly preferably used in the optical films such as a polarizing film protecting film, a retardation film, and an antireflection film.

When the resin composition is used for the polarizing film protecting film, it is preferable that the optical anisotropy is small. The in-plane phase difference (Re) calculated by the following (Equation 1) is 20 nm or less, preferably 10 nm or less, and more preferably 5 nm or less. The thickness phase difference (Rth) calculated by the following (Equation 2) is 50 nm or less, preferably 20 nm or less, and more preferably 5 nm or less. When the in-plane phase difference (Re) is 20 nm or less and the thickness phase difference is 50 nm or less, it is preferable since the usage of the polarizing film protecting film for a polarizing plate of a liquid crystal display would not arise problems such as decrease in contrast of the liquid crystal display.

$$Re=(nx-ny)\times d \quad \text{(Equation 1)}$$

$$Rth=\{(nx-ny)/2-nz\}\times d \quad \text{(Equation 2)}$$

Here, in the afore-described equation, nx, ny, and nz are obtained as follows. The direction in which the in-plane refractive index becomes largest is taken as the x-axis, the direction perpendicular to the x-axis is taken as the y-axis, and the direction in the thickness of the film is taken as the z-axis. The nx, ny, and nz are each the refractive index in the x-axis direction, y-axis direction, and z-axis direction, respectively. Here, d is the thickness of the film.

There is no particular limitation regarding the manufacturing method of the polarizing film protecting film, and a known forming methods such as a melt extrusion film forming method and a solution casting film forming method can be used. As one example of obtaining small optical anisotropy, a method in which a flexible roll capable of elastic deformation is used can be mentioned. Here, any forming method can be used so long as the optical anisotropy can be made small. A non-stretched film having a small optical anisotropy can be used as it is as the polarizing film protecting film. Here, in order to improve film strength, the film can be stretched to an extent complying with the desired optical anisotropy, and then the stretched film can be used as the polarizing film protecting film.

As another example for obtaining small optical anisotropy, a method in which polymers having a positive intrinsic birefringence such as polycarbonate, polyethylene terephthalate, and polyphenylene ether are blended; a method in which an inorganic needle crystal fine particles are added, and the like can be mentioned. Here, any method can be used so long as the optical anisotropy can be made small.

When the resin composition is used as a retardation film or an antireflection film, the resin composition is first molded into a film in a similar manner as the polarizing film protecting film, and then the stretching condition is adjusted to obtain the desired in-plane phase difference (Re) and the thickness phase difference (Rth). When the stretched film is used as the retardation film or the antireflection film, the stretched film is often layered with another stretched film and is used as a λ/2 plate to convert the vibration direction of the polarized light or a λ/4 plate to convert a circularly polarized light into a linearly polarized light or to convert a linearly polarized light into a circularly polarized light. Therefore, the stretched film should have a suitable phase difference developing property; and the in-plane phase difference (Re) and the thickness phase difference (Rth) of the stretched film as well as the other stretched film to be laminated are adjusted to have a desired phase difference.

EXAMPLES

Manufacturing Example of Copolymer (A-1)

A 20% maleic acid anhydride solution was prepared by dissolving maleic acid anhydride in methyl isobutyl ketone so that the maleic acid anhydride is contained by 20 mass %, and a 2% t-butyl peroxy-2-ethyl hexanoate solution was prepared by diluting t-butyl peroxy-2-ethyl hexanoate with methyl isobutyl ketone so that the t-butyl peroxy-2-ethyl hexanoate is contained by 2 mass %. These solutions were used in the polymerization.

To a 120 liter autoclave equipped with an agitator, 20% maleic acid anhydride solution (2.4 kg), styrene (24 kg), methyl methacrylate (11.2 kg), t-dodecyl mercaptan (30 g), and methyl isobutyl ketone (2 kg) were added. The gas in the remaining space of the autoclave was replaced with nitrogen gas, and the temperature of the mixture was raised to 87° C. taking 40 minutes with agitation. After raising the temperature, the temperature of the mixture was kept at 87° C., the 20% maleic acid anhydride solution was added separately at an addition speed of 1.8 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (30 g) was added. On the other hand, the 20% maleic acid anhydride solution was added separately keeping the addition speed of 1.8 kg/hour, and the temperature of the mixture was raised to 120° C. with a temperature raising speed of 8.25° C./hour taking 4 hours. The separate addition of the 20% maleic acid anhydride solution was terminated when the accumulated amount of the separate addition reached 18 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-1). The copolymer (A-1) thus obtained was subjected to composition analysis using C-13NMR method. Subsequently, molecular weight was measured using GPC. Then, a mirror plate having a thickness of 2 mm was molded using an injection molding machine, and total light transmittance was measured using a haze meter. The result of the composition analysis, result of the molecular weight measurement, and the result of total light transmittance measurement are shown in Table 1.

Manufacturing Example of Copolymer (A-2)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2.8 kg), styrene (24 kg), methyl methacrylate (10.4 kg), and t-dodecyl mercaptan (40 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.1 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.1 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 25.2 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-2). In a similar manner as A-1, the copolymer A-2 thus obtained was subjected to measurement of composition, molecular weight, and total light transmittance. The results are shown in Table 1.

Manufacturing Example of Copolymer (A-3)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (3.4 kg), styrene (24 kg), methyl methacrylate (9.2 kg), and t-dodecyl mercaptan (60 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.55 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.55 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 30.6 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-3). In a similar manner as A-1, the copolymer A-3 thus obtained was subjected to measurement of composition, molecular weight, and total light transmittance. The results are shown in Table 1.

Manufacturing Example of Copolymer (A-4)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2 kg), styrene (24 kg), methyl methacrylate (12 kg), t-dodecyl mercaptan (40 g), and methyl isobutyl ketone (5 kg) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 1.5 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 1.5 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 18 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-4). In a similar manner as A-1, the copolymer A-4 thus obtained was subjected to measurement of composition, molecular weight, and total light transmittance. The results are shown in Table 1.

Manufacturing Example of Copolymer (A-5)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (3.8 kg), styrene (24 kg), methyl methacrylate (8.4 kg), and t-dodecyl mercaptan (32 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.85 kg/hour, and the 2% t-butyl peroxy-2-ethyl hexanoate solution was added separately at an addition speed of 300 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.85 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 34.2 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-5). In a similar manner as A-1, the copolymer A-5 thus obtained was subjected to measurement of composition, molecular weight, and total light transmittance. The results are shown in Table 1.

Manufacturing Example of Copolymer (A-6)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2.8 kg), styrene (30.4 kg), methyl methacrylate (3 kg), and t-dodecyl mercaptan (36 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 1.4 kg/hour, methyl methacrylate was added separately at an addition speed of 56 g/hour, and the 2% t-butyl peroxy-2-ethyl hexanoate solution was added separately at an addition speed of 300 g/hour. Here, each of the solutions was added continuously for 10 hours. Subsequently, the separate addition of the 2% t-butyl peroxy-2-ethyl hexanoate solution was terminated, and t-butyl peroxy isopropyl monocarbonate (60 g) was added. On the other hand, the 20% maleic acid anhydride solution was added separately keeping the addition speed of 1.4 kg/hour, methyl methacrylate was added separately keeping the addition speed of 56 g/hour, and the temperature of the mixture was raised to 124° C. with a temperature raising speed of 4° C./hour taking 9 hours. The separate addition of the 20% maleic acid anhydride solution was terminated when the accumulated amount of the separate addition reached 25.2 kg, and the separate addition of methyl methacrylate was terminated when the accumulated amount of the separate addition reached 1 kg. After the temperature of the mixture was raised, the mixture was kept at 124° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-6). In a similar manner as A-1, the copolymer A-6 thus obtained was subjected to measurement of composition, molecular weight, and total light transmittance. The results are shown in Table 1.

Manufacturing Example of Copolymer (A-7)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2.8 kg), styrene (13.8 kg), methyl methacrylate (16 kg), and t-dodecyl mercaptan (48 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.8 kg/hour, styrene was added separately at an addition speed of 0.5 kg/hour, and the 2% t-butyl peroxy-2-ethyl hexanoate solution was added separately at an addition speed of 300 g/hour. Here, each of the solutions was added continuously for 6 hours. Subsequently, the separate addition of the 2% t-butyl peroxy-2-ethyl hexanoate solution was terminated, and t-butyl peroxy isopropyl monocarbonate (20 g) was added. On the other hand, the 20% maleic acid anhydride solution was added separately keeping the addition speed of 2.8 kg/hour, styrene was added separately keeping the addition speed of 0.5 kg/hour, and the temperature of the mixture was raised to 118° C. with a temperature raising speed of 10° C./hour taking 3 hours. The separate addition of the 20% maleic acid anhydride solution was terminated when the accumulated amount of the separate addition reached 25.2 kg, and the separate addition of styrene was terminated when the accumulated amount of the separate addition reached 4.5 kg. After the temperature of the mixture was raised, the mixture was kept at 118° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-7). In a similar manner as A-1, the copolymer A-7 thus obtained was subjected to measurement of composition, molecular weight, and total light transmittance. The results are shown in Table 1.

Manufacturing Example of Copolymer (A-8)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2.8 kg), styrene (24 kg), and methyl methacrylate (10.4 kg) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 1.68 kg/hour, and the 2% t-butyl peroxy-2-ethyl hexanoate solution was added separately at an addition speed of 200 g/hour. Here, each of the solutions was added continuously for 10 hours. Subsequently, the separate addition of the 2% t-butyl peroxy-2-ethyl hexanoate solution was terminated, and t-butyl peroxy isopropyl monocarbonate (20 g) was added. On the other hand, the 20% maleic acid anhydride solution was added separately keeping the addition speed of 1.68 kg/hour, and the temperature of the mixture was raised to 120° C. with a temperature raising speed of 6.4° C./hour taking 5 hours. The separate addition of the 20% maleic acid anhydride solution was terminated when the accumulated amount of the separate addition reached 25.2 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-8). In a similar manner as A-1, the copolymer A-8 thus obtained was subjected to measurement of composition, molecular weight, and total light transmittance. The results are shown in Table 1.

Manufacturing Example of Copolymer (A-9)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2.8 kg), styrene (24 kg), methyl methacrylate (10.4 kg), and t-dodecyl mercaptan (300 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.1 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.1 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 25.2 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (A-9). In a similar manner as A-1, the copolymer A-9 thus obtained was subjected to measurement of composition, molecular weight, and total light transmittance. The results are shown in Table 1.

Manufacturing Example of Copolymer (B-1)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (12 kg), styrene (24 kg), methyl methacrylate (11.2 kg), t-dodecyl mercaptan (30 g), and methyl isobutyl ketone (2 kg) were added. The gas in the remaining space of the autoclave was replaced with nitrogen gas, and the temperature of the mixture was raised to 87° C. taking 40 minutes with agitation. After raising the temperature, the temperature of the mixture was kept at 87° C., the 20% maleic acid anhydride solution was added separately at an addition speed of 0.75 kg/hour, and the 2% t-butyl peroxy-2-ethyl hexanoate solution was added separately at an addition speed of 375 g/hour. Here, each of the solutions was added continuously for 12 hours. Subsequently, the separate addition of the 2% t-butyl peroxy-2-ethyl hexanoate solution was terminated, and t-butyl peroxy isopropyl monocarbonate (30 g) was added. On the other hand, the 20% maleic acid anhydride solution was added separately keeping the addition speed of 0.75 kg/hour, and the temperature of the mixture was raised to 120° C. with a temperature raising speed of 8.25° C./hour taking 4 hours. The separate addition of the 20% maleic acid anhydride solution was terminated when the accumulated amount of the separate addition reached 12 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (B-1). In a similar manner as A-1, the copolymer B-1 thus obtained was subjected to measurement of composition, molecular weight, and total light transmittance. The results are shown in Table 2.

Manufacturing Example of Copolymer (B-2)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (2.8 kg), styrene (24 kg), methyl methacrylate (10.4 kg), and t-dodecyl mercaptan (40 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.1 kg/hour, and the 2% t-butyl peroxy-2-ethyl hexanoate solution was added separately at an addition speed of 750 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.1 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 25.2 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (B-2). In a similar manner as A-1, the copolymer B-2 thus obtained was subjected to measurement of composition, molecular weight, and total light transmittance. The results are shown in Table 2.

Manufacturing Example of Copolymer (B-3)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (8 kg), styrene (0.8 kg), methyl methacrylate (17.6 kg), and t-dodecyl mercaptan (30 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.5 kg/hour, and the 2% t-butyl peroxy-2-ethyl hexanoate solution was added separately at an addition speed of 250 g/hour. Here, each of the solutions was added continuously for 6 hours. Subsequently, the separate addition of the 2% t-butyl peroxy-2-ethyl hexanoate solution was terminated, and t-butyl peroxy isopropyl monocarbonate (10 g) was added. On the other hand, the 20% maleic acid anhydride solution was added separately keeping the addition speed of 2.5 kg/hour, and the temperature of the mixture was raised to 120° C. with a temperature raising speed of 16° C./hour taking 2 hours. The separate addition of the 20% maleic acid anhydride solution was terminated when the accumulated amount of the separate addition reached 20 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (B-3). In a similar manner as A-1, the copolymer B-3 thus obtained was subjected to measurement of composition, molecular weight, and total light transmittance. The results are shown in Table 2.

Manufacturing Example of Copolymer (B-4)

A 10% maleic acid anhydride solution was prepared by dissolving maleic acid anhydride in methyl isobutyl ketone so that the maleic acid anhydride is contained by 10 mass %, and a 2% t-butyl peroxy-2-ethyl hexanoate solution was prepared by diluting t-butyl peroxy-2-ethyl hexanoate with methyl isobutyl ketone so that the t-butyl peroxy-2-ethyl hexanoate is contained by 2 mass %. These solutions were used in the polymerization.

To a 120 liter autoclave equipped with an agitator, 10% maleic acid anhydride solution (2 kg), styrene (24 kg), methyl methacrylate (14 kg), t-dodecyl mercaptan (48 g), and methyl isobutyl ketone (2 kg) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 10% maleic acid anhydride solution was added separately at an addition speed of 1.5 kg/hour, and the 2% t-butyl peroxy-2-ethyl hexanoate solution was added separately at an addition speed of 300 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 10% maleic acid anhydride solution was added separately keeping the addition speed of 1.5 kg/hour, and the temperature of the mixture was raised to 120° C. with a temperature raising speed of 7.5° C./hour taking 4 hours. The separate addition of the 10% maleic acid anhydride solution was terminated when the accumulated amount of the separate addition reached 18 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (B-4). In a similar manner as A-1, the copolymer B-4 thus obtained was subjected to measurement of composition, molecular weight, and total light transmittance. The results are shown in Table 2.

Manufacturing Example of Copolymer (B-5)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (5 kg), styrene (24 kg), methyl methacrylate (6 kg), and t-dodecyl mercaptan (32 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 3.75 kg/hour, and the 2% t-butyl peroxy-2-ethyl hexanoate solution was added separately at an addition speed of 300 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 3.75 kg/hour, and the temperature of the mixture was raised to 120° C. with a temperature raising speed of 8° C./hour taking 4 hours. The separate addition of the 20% maleic acid anhydride solution was terminated when the accumulated amount of the separate addition reached 45 kg. After the temperature of the mixture was raised, the mixture was kept at 120° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (B-5). In a similar manner as A-1, the copolymer B-5 thus obtained was subjected to measurement of composition, molecular weight, and total light transmittance. The results are shown in Table 2.

Manufacturing Example of Copolymer (B-6)

The 20% maleic acid anhydride solution and the 2% t-butyl peroxy-2-ethyl hexanoate solution were prepared in a similar manner as A-1.

To a 120 liter autoclave equipped with an agitator, 20% maleic acid anhydride solution (1.2 kg), styrene (35.2 kg), t-dodecyl mercaptan (30 g), and methyl isobutyl ketone (2 kg) were added. The gas in the remaining space of the autoclave was replaced with nitrogen gas, and the temperature of the mixture was raised to 92° C. taking 40 minutes with agitation. After raising the temperature, the temperature of the mixture was kept at 92° C., the 20% maleic acid anhydride solution was added separately at an addition speed of 0.76 kg/hour, and the 2% t-butyl peroxy-2-ethyl hexanoate solution was added separately at an addition speed of 250 g/hour. Here, each of the solutions was added continuously for 15 hours. Subsequently, the separate addition of the 2% t-butyl peroxy-2-ethyl hexanoate solution was terminated, and t-butyl peroxy isopropyl monocarbonate (60 g) was added. On the other hand, the 20% maleic acid anhydride solution was added separately keeping the addition speed of 0.76 kg/hour, and the temperature of the mixture was raised to 128° C. with a temperature raising speed of 4° C./hour taking 9 hours. The separate addition of the 20% maleic acid anhydride solution was terminated when the accumulated amount of the separate addition reached 18.24 kg. After the temperature of the mixture was raised, the mixture was kept at 128° C. for 1 hour, and the polymerization was completed. The polymerization solution was continuously fed to a twin-screw devolatilizing extruder using a gear pump, followed by devolatilization treatment of methyl isobutyl ketone, a small amount of unreacted monomers, and the like. Subsequently, the resultant was extruded as a strand and was cut into pellets of the copolymer (B-6). In a similar manner as A-1, the copolymer B-6 thus obtained was subjected to measurement of composition, molecular weight, and total light transmittance. The results are shown in Table 2.

Manufacturing Example of Methacrylic Resin (C-1)

A 20 liter continuous stirred tank reactor equipped with an agitator, a 40 liter tower-type plug flow reactor, and a devolatilization tank equipped with a preheater were connected in series. To a mixture solution comprising methyl methacrylate (98 parts by mass), ethyl acrylate (2 parts by mass), and ethyl benzene (18 parts by mass), 1,1-bis(t-butylperoxy)-cyclohexane (0.02 parts by mass, available from NOF CORPORATION as PERHEXA C), n-dodecyl mercaptan (0.3 parts by mass, available from Kao Corporation as THIOKALCOL 20), octadecyl-3-(3,5-di-t-butyl-4-hydroxyphenyl) propionate (0.1 parts by mass, available from Ciba Specialty Chemicals Inc. as IRGANOX 1076) were added to prepare a raw material solution. The raw material solution was introduced into the continuous stirred tank reactor at a speed of 6 kg/hour. Here, the temperature of the continuous stirred tank reactor was set to 120° C., and the rotation number of the agitator was 200 rpm. Subsequently, the reaction solution was continuously taken out from the continuous stirred tank reactor, and was introduced into the tower-type plug flow reactor. Here, the tower-type plug flow reactor was regulated to have a temperature gradient from 130° C. to 150° C. in the direction towards the flow. The reaction solution was heated with the preheater, while being introduced into the devolatilization tank. Here, the devolatilization tank was regulated to have a temperature of 240° C. and a pressure of 1.0 kPa. Accordingly, the volatile component such as the unreacted monomers and the like were removed. The resin solution thus obtained was taken out using a gear pump and was then extruded as a strand and cut into pellets of the methacrylic resin (C-1). In a similar manner as A-1, the methacrylic resin (C-1) thus obtained was subjected to measurement of composition, molecular weight, and total light transmittance. The results are shown in Table 3.

Manufacturing Example of Methacrylic Resin (C-2)

A 20 liter continuous stirred tank reactor equipped with an agitator, a 40 liter tower-type plug flow reactor, and a devolatilization tank equipped with a preheater were connected in series. To a mixture solution comprising methyl methacrylate (78 parts by mass), styrene (22 parts by mass), and ethyl benzene (12 parts by mass), 1,1-bis(t-butylperoxy)-cyclohexane (0.02 parts by mass, available from NOF CORPORATION as PERHEXA C), n-dodecyl mercaptan (0.3 parts by mass, available from Kao Corporation as THIOKALCOL 20), octadecyl-3-(3,5-di-t-butyl-4-hydroxyphenyl) propionate (0.1 parts by mass, available from Ciba Specialty Chemicals Inc. as IRGANOX 1076) were added to prepare a raw material solution. The raw material solution was introduced into the continuous stirred tank reactor at a speed of 6 kg/hour. Here, the temperature of the continuous stirred tank reactor was set to 125° C., and the rotation number of the agitator was 200 rpm. Subsequently, the reaction solution was continuously taken out from the continuous stirred tank reactor, and was introduced into the tower-type plug flow reactor. Here, the tower-type plug flow reactor was regulated to have a temperature gradient from 130° C. to 150° C. in the direction towards the flow. The reaction solution was heated with the preheater, while being introduced into the devolatilization tank. Here, the devolatilization tank was regulated to have a temperature of 240° C. and a pressure of 1.0 kPa. Accordingly, the volatile component such as the unreacted monomers and the like were removed. The resin solution thus obtained was taken out using a gear pump and was then extruded as a strand and out into pellets of the methacrylic resin (C-2). In a similar manner as A-1, the methacrylic resin (C-2) thus obtained was subjected to measurement of composition, molecular weight, and total light transmittance. The results are shown in Table 3.

TABLE 1

| | | results of analysis for copolymers (A-1) to (A-7) | | | | | | | | |
|---|---|---|---|---|---|---|---|---|---|---|
| | | A-1 | A-2 | A-3 | A-4 | A-5 | A-6 | A-7 | A-8 | A-9 |
| composition analysis: ST unit | mass % | 59.9 | 60.0 | 60.1 | 59.8 | 60.1 | 75.3 | 46.7 | 60.0 | 60.0 |
| composition analysis: MMA unit | mass % | 27.7 | 25.6 | 22.5 | 29.8 | 20.3 | 10.0 | 39.1 | 25.4 | 25.6 |
| composition analysis: MAH unit | mass % | 12.4 | 14.4 | 17.4 | 10.4 | 19.6 | 14.7 | 14.2 | 14.6 | 14.4 |
| weight average molecular weight (Mw) × $10^4$ | g/mol | 18.0 | 15.3 | 12.6 | 15.1 | 15.5 | 14.6 | 15.3 | 24.5 | 8.9 |
| total light transmittance of 2 mm thick mirror plate | % | 91.2 | 91.8 | 91.1 | 90.8 | 90.2 | 89.8 | 89.5 | 90.3 | 91.5 |

* ST, MMA, and MAH in the Table are abbreviation of styrene monomer, methyl methacrylate monomer, and maleic acid anhydride monomer, respectively

TABLE 2

| | | results of analysis for copolymers (B-1) to (B-6) | | | | | |
|---|---|---|---|---|---|---|---|
| | | B-1 | B-2 | B-3 | B-4 | B-5 | B-6 |
| composition analysis: ST unit | mass % | 59.4 | 60.6 | 20.7 | 59.6 | 60.2 | 87.6 |
| composition analysis: MMA unit | mass % | 27.9 | 25.6 | 65.3 | 35.2 | 14.2 | 0.0 |
| composition analysis: MAH unit | mass % | 12.7 | 13.8 | 14.0 | 5.2 | 25.6 | 12.4 |
| weight average molecular weight (Mw) × $10^4$ | g/mol | 18.0 | 15.5 | 15.5 | 14.1 | 15.5 | 17.7 |
| total light transmittance of 2 mm thick mirror plate | % | 84.3 | 79.1 | 88.8 | 90.1 | 90.0 | 88.0 |

* ST, MMA, and MAH in the Table are abbreviation of styrene monomer, methyl methacrylate monomer, and maleic acid anhydride monomer, respectively

TABLE 3

| results of analysis for methacryl resins (C-1) to (C-2) | | C-1 | C-2 |
|---|---|---|---|
| composition analysis: MMA unit | mass % | 98.0 | 77.8 |
| composition analysis: EA unit | mass % | 2.0 | 0.0 |
| composition analysis: ST unit | mass % | 0.0 | 22.2 |
| weight average molecular weight (Mw) × $10^4$ | g/mol | 7.5 | 8.3 |
| total light transmittance of 2 mm thick mirror plate | % | 92.0 | 91.8 |

* MMA, EA, and ST in the Table are abbreviation of methyl methacrylate monomer, ethyl acrylate monomer, and styrene monomer, respectively

EXAMPLES AND COMPARATIVE EXAMPLES

The copolymers (A-1) to (A-9) or the copolymers (B-1) to (B-6) were blended with the methacrylic resins (C-1) to (C-2) by the formulation ratio (mass %) provided in Table 4 and Table 5, using a Henschel mixer. Subsequently, a twin screw extruder (TEM-35B, available from TOSHIBA MACHINE CO., LTD.) was used to perform melt kneading with a cylinder temperature of 230° C., and a pelletized resin composition was obtained.

The resin composition was subjected to the following evaluations. The results of evaluations are shown in Table 4 and Table 5.

(Total Light Transmittance and Haze)

The total light transmittance and the haze were measured as follows. First, a mirror plate having a length of 90 mm, a width of 55 mm, and a thickness of 2 mm was prepared using an injection molding machine (IS-50EPN, available from TOSHIBA MACHINE CO., LTD.), with the molding conditions of a cylinder temperature of 230° C. and a mold temperature of 40° C. Then, the mirror plate was subjected to the measurement in compliance with ASTM D1003, using a haze meter (NDH-1001DP, available from NIPPON DENSHOKU INDUSTRIES CO., LTD.).

(Charpy Impact Strength)

The Charpy impact strength was measured in accordance with JIS K7111-1:2006. Here, unnotched test pieces were used, and the impact was applied in the edgewise direction. A digital impact testing apparatus (available from Toyo Seiki Seisaku-sho, Ltd.) was used as the measuring apparatus.

(Vicat Softening Temperature)

The Vicat softening temperature was measured in accordance with JIS K7206:1999. Here, Method 50 (load: 50N, temperature raising speed 50° C./hour) was used, and the test piece having the size of 10 mm×10 mm and 4 mm thickness was used. HDT & VSP testing apparatus (available from Toyo Seiki Seisaku-sho, Ltd.) was used as the measuring apparatus.

(Appearance of Extrusion Molded Product)

Samples of cylinder-shaped molded product having a diameter of 30 mm and a height of 50 mm were prepared by the number of 50, using an injection molding machine (IS-50EPN, available from TOSHIBA MACHINE CO., LTD.), with the molding conditions of a cylinder temperature of 230° C. and a mold temperature of 40° C. Then, number of samples having a defective appearance such as a silver streak, a flow mark, a gas burning, an air void and the like, was counted by visual observation. The criteria for the evaluation were as follows.

A: number of samples having defective appearance is 0

B: number of samples having defective appearance is 1 to 2

C: number of samples having defective appearance is 3 to 5

D: number of samples having defective appearance is 6 or more

TABLE 4

| | | | Example | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| resin composition | copolymer | A-1 | 25 | | | | | | | | | | | 30 | 50 | | |
| | | A-2 | | 25 | 50 | 75 | | | | | | | | | | 25 | |
| | | A-3 | | | | | 10 | 25 | | | | | | | | | |
| | | A-4 | | | | | | | | | | | | | | | 25 |
| | | A-5 | | | | | | | 25 | | | | | | | | |
| | | A-6 | | | | | | | | 25 | | | | | | | |
| | | A-7 | | | | | | | | | 25 | | | | | | |
| | | A-8 | | | | | | | | | | 25 | | | | | |
| | | A-9 | | | | | | | | | | | 25 | | | | |
| | methacrylic resin | C-1 | 75 | 75 | 50 | 25 | 90 | 75 | 75 | 75 | 75 | 75 | 75 | | | | |
| | | C-2 | | | | | | | | | | | | 70 | 50 | 75 | 75 |
| evaluation | total light transmittance (%) | | 90.5 | 90.8 | 90.4 | 89.5 | 90.7 | 90.4 | 88.0 | 89.1 | 86.5 | 90.5 | 90.8 | 90.8 | 90.5 | 90.5 | 89.5 |
| | Haze (%) | | 0.5 | 0.5 | 0.7 | 1.0 | 0.4 | 0.6 | 1.8 | 1.2 | 2.4 | 2.8 | 0.5 | 0.5 | 0.6 | 0.6 | 1.0 |
| | Charpy impact strength [unnotched] (kJ/m$^2$) | | 17.6 | 16.1 | 14.4 | 12.7 | 18.3 | 15.3 | 14.8 | 14.3 | 15.7 | 16.3 | 10.9 | 16.0 | 14.5 | 15.5 | 15.0 |
| | Vicat softening temperature (° C.) | | 113 | 115 | 120 | 123 | 111 | 117 | 118 | 112 | 115 | 115 | 112 | 115 | 119 | 115 | 111 |
| | appearance of extrusion molded product | | A | A | B | C | A | A | B | A | C | C | B | A | B | A | A |

TABLE 5

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| resin composition | copolymer | B-1 | 25 | | | | | | 30 | | | |
| | | B-2 | | 25 | | | | | | 25 | | |
| | | B-3 | | | 25 | | | | | | | |
| | | B-4 | | | | 25 | | | | | | |
| | | B-5 | | | | | 25 | | | | | |
| | | B-6 | | | | | | 25 | | | | |
| | methacrylic resin | C-1 | 75 | 75 | 75 | 75 | 75 | 75 | | | 100 | |
| | | C-2 | | | | | | | 70 | 75 | | 100 |
| evaluation | total light transmittance (%) | | 82.3 | 77.6 | 87.5 | 64.5 | 73.5 | 86.3 | 83.6 | 75.1 | 92.0 | 91.8 |
| | Haze (%) | | 20.6 | 41.5 | 2.4 | 96.0 | 78.2 | 10.3 | 15.3 | 56.5 | 0.3 | 0.3 |
| | Charpy impact strength [unnotched] (kJ/m$^2$) | | 15.6 | 12.2 | 14.7 | 9.8 | 6.3 | 13.5 | 16.0 | 10.0 | 18.8 | 18.5 |
| | Vicat softening temperature (° C.) | | 110 | 112 | 112 | 107 | 109 | 112 | 112 | 109 | 107 | 107 |
| | appearance of extrusion molded product | | D | D | D | D | D | C | D | D | A | A |

The pellets used in Examples 1 and 2 and Comparative Examples 1 and 2 were dried at 90° C. for 2 hours, followed by extrusion at 260° C. using a 40 mmφ single screw extruder and a 300 mm width T-die to give a sheet-form melt resin. The sheet-form melt resin thus obtained was crimped with a flexible roll, and was cooled with a cooling roll. Accordingly, a film having a width of 250 mm and a thickness of 100±5 μm was obtained. The following evaluation was performed with the film obtained. Results of the evaluation are shown in Table 6.

(Film Appearance)

Appearance was visually observed for 1 m$^2$ of the center portion (200 mm width×5 m length) of the non-stretched film. The criteria for the evaluation were as follows.

A: film with less than 5 small defects (approximately 0.08 to 0.2 mm) found by visual observation and no remarkable defective phenomenon such as die lines and melt fracture occurred with the film B: film with 1 or more remarkable defects (defects of 0.2 mm or larger including air voids), 5 or more small defects found by visual observation, or remarkable defective phenomenon such as die lines and melt fracture occurred with the film (Film Strength)

Test pieces were cut out from the non-stretched film. Falling ball impact test was conducted with the test pieces in accordance with the following conditions, and the impact energy at which 50% of the test pieces broke was measured.

Test Piece: non-stretched film having the size of 50 mm length×50 mm width×100±5 μm thickness Plumb Bob: iron ball of 11 mm diameter, 5.45 g weight Fixing Condition: The film was pinched with a ring (inner diameter: 43 mm), and was fixed by 4 clips placed at upper, lower, left, and right positions.

The height at which 50% of the test pieces broke was measured with 1 cm interval in accordance with JIS K7211. The impact energy at which 50% of the test pieces broke was calculated from the results thus obtained.

(Measurement of Phase Difference)

The non-stretched film was stretched in accordance with the following conditions.

Name of Apparatus: biaxial stretching testing apparatus EX10-B

Test Piece: non-stretched film having the size of 90 mm×90 mm×100±5 μm thickness Stretching Temperature: Vicat softening temperature+5° C.

Stretching Speed: 25 mm/min
Stretching Ratio: 2 times
Stretching Method: uniaxial stretching with free width The in-plane phase difference Re(590) and the thickness phase difference Rth were measured with the non-stretched film and the stretched film, by using the apparatus described below. Here, the ones which broke during the stretching due to lack of film strength were determined as unacceptable, since they were unmeasureable.

Name of Apparatus: birefringence measurement apparatus "KOBRA-WR (available from Oji Scientific Instruments)"

Measurement Wavelength: 590 nm

TABLE 6

|  |  |  | Example | | Comparative Example | |
|---|---|---|---|---|---|---|
|  |  |  | 16 | 17 | 11 | 12 |
| resin composition | copolymer | A-1 | 25 | | | |
|  |  | A-2 | | 25 | | |
|  |  | B-1 | | | 25 | |
|  |  | B-2 | | | | 25 |
|  | methacrylic resin | C-1 | 75 | 75 | 75 | 75 |
| evaluation | film appearance | | excellent | excellent | poor | poor |
|  | film strength (mJ) | | 16 | 13 | 3 | 2 |
|  | in-plane phase difference Re of non-stretched film (nm) | | 3.1 | 2.5 | 4.0 | 4.8 |
|  | thickness phase difference Rth of non-stretched film (nm) | | −1.5 | −1.3 | −1.9 | −2.4 |
|  | in-plane phase difference Re of stretched film (nm) | | 126.3 | 118.5 | broke | broke |
|  | thickness phase difference Rth of stretched film (nm) | | −62.3 | −58.9 | broke | broke |

All of the Examples of the resin composition formulating the copolymers for improving heat resistance of a methacrylic resin of the present invention (A-1) to (A-9) and the methacrylic resin showed excellent transparency, impact strength, and heat resistance; and the molded product had excellent appearance. On the other hand, Comparative Examples of the resin composition formulating the copolymers (B-1) to (B-6) which did not satisfy the conditions of the present invention and the methacrylic resin were inferior in either one of transparency, impact strength, and heat resistance; or the molded product had poor appearance.

INDUSTRIAL APPLICABILITY

According to the present invention, a copolymer for improving heat resistance of a methacrylic resin which can achieve preservation of excellent transparency of the methacrylic resin and improvement in heat resistance, and can provide a molded product having excellent appearance, by adding the copolymer to the methacrylic resin, can be provided.

What is claimed is:

1. A resin composition, comprising:
   5 to 50 mass % of a copolymer for improving heat resistance of a methacrylic resin; and
   50 to 95 mass % of a methacrylic resin,
   wherein the copolymer comprises:
   45 to 85 mass % of an aromatic vinyl monomer unit;
   5 to 45 mass % of a (meth)acrylic acid ester monomer unit; and
   10 to 20 mass % of an unsaturated dicarboxylic acid anhydride monomer unit; and
   wherein the copolymer has a total light transmittance of 88% or more, the total light transmittance being measured in accordance with ASTM D1003 for a sample with 2 mm-thickness, and
   the methacrylic resin is a copolymer of methyl methacrylate and ethyl methacrylate, or a copolymer of methyl methacrylate and styrene, wherein the copolymer of methyl methacrylate and styrene comprises: 70 mass % or more of methyl methacrylate monomer unit; and 30 mass % or less of styrene monomer unit.

2. A molded body comprising the resin composition of claim 1.

3. The molded body of claim 2, being an optical part.

4. The molded body of claim 3, being an optical film.

5. The molded body of claim 4, wherein the optical film is selected from the group consisting of a polarizing film, a protecting film, a retardation film, and an antireflection film.

6. The resin composition of claim 1, comprising:
   50 to 80 mass % of the aromatic vinyl monomer unit;
   8 to 38 mass % of the (meth)acrylic acid ester monomer unit; and
   12 to 18 mass % of the unsaturated dicarboxylic acid anhydride monomer unit.

7. The resin composition of claim 1, wherein the weight average molecular weight (Mw) of the copolymer is $10 \times 10^4$ to $20 \times 10^4$.

8. The resin composition of claim 6, wherein the weight average molecular weight (Mw) of the copolymer is $10 \times 10^4$ to $20 \times 10^4$.

9. A molded body comprising the resin composition of claim 6.

10. A molded body comprising the resin composition of claim 7.

11. A molded body comprising the resin composition of claim 8.

* * * * *